United States Patent Office 3,832,204
Patented Aug. 27, 1974

3,832,204
SILICATE POLYMER VEHICLES FOR USE IN PROTECTIVE COATINGS AND PROCESS OF MAKING
Donald P. Boaz, 5854 Preston View, Dallas, Tex. 75240
No Drawing. Continuation-in-part of application Ser. No. 70,215, Sept. 8, 1970, now Patent No. 3,730,746, which is a continuation-in-part of abandoned application Ser. No. 749,587, Aug. 2, 1968. This application Feb. 8, 1973, Ser. No. 330,696
The portion of the term of the patent subsequent to May 1, 1990, has been disclaimed
Int. Cl. C07g 17/00; C09d 5/10
U.S. Cl. 106—287 SE                        19 Claims

ABSTRACT OF THE DISCLOSURE

Silicate polymer vehicles are obtained by partially hydrolyzing alkyl silicate and reacting the resultant composition with a vinyl resin, such as polyvinyl butyral and one or more additives such as an alkyl orthoborate, an ambifunctional silane, or a Lewis Acid metal salt and ethyl cellulose to produce a vehicle for use in protective coatings of various kinds and particularly coatings for use on metal.

---

This is a continuation-in-part of my earlier filed copending application Ser. No. 70,215, filed Sept. 8, 1970, now U.S. Pat. No. 3,730,746, which was a continuation-in-part of my earlier filed application Ser. No. 749,587, filed Aug. 2, 1968, now abandoned.

Many silicate polymer vehicles are known including some which are used in coating compositions such as paints and the like. For the most part, however, the known vehicles have relatively short shelf lives, undesirable drying times, must be applied to preconditioned surfaces such as sandblasted surfaces to have a proper adhesion, are relatively soft and are easily scratched and worn, and are unable to hold pigments in suspension and therefore require frequent or constant agitation. Some known silicate polymer vehicles also become porous rather than forming a smooth continuous layer when dry which of course is not desirable for a protective coating.

Also various vehicles for protective coating substances and paints have been devised heretofore which have included as their additive ingredient a titanate substance. For the most part, paint vehicles which include only a titanate ingredient or additive usually can only be applied satisfactorily over the surfaces which have been prepared in advance in some way such as by sandblasting. This is so because the titanate vehicles generally have relatively poor adhesive characteristics. The present invention, on the other hand, teaches the formulation of vehicles in which an alkyl orthoborate, an ambifunctional silane or a Lewis Acid metal salt is substituted for or used with a titanate additive. The present invention also teaches the use of combinations of two or more of these three additive ingredients in the same vehicle and in some cases it has also been found to be desirable to include a titanate in combination with one or several of these substances. The present application does not, however, cover a paint vehicle which includes only a titanate ingredient for the reasons mentioned above.

As will be explained, the use of one or a combination of the above named three ingredients produces improved vehicle adhesion characteristics and it also produces a more stable vehicle and one that has a longer shelf life. Paints formulated according to the present invention also provide better protection for the object or surface coated by being harder, tougher, and more resistant to temperature extremes. As will be explained hereinafter, the use of the above named additives and their proportion will to some extent affect the characteristics of the final product and it is anticipated that certain combinations of the additives will produce more suitable characteristics for certain applications than others and it is anticipated that some selection of the ingredients and their proportions may be necessary in some cases to produce the most desired final results on coating. It is also to be noted that the subject vehicle formulations are suitable for use in primers as well as in finish coats and these can be applied in all of the known ways for applying paints including by brushing, spraying, dipping and so on. The present vehicles can also be manufactured relatively quickly and easily with a minimum of equipment, and in those cases where certain of the reaction times may be relatively long these reactions can be carried out in the container in which the product is packaged for shipping or for storage.

The partially hydrolyzed alkyl silicates in the subject vehicles are alkyl orthosilicates of the formula $Si(OR_1)_4$ in which each of the alkyl groups, $R_1$, contain from 1 to 8 carbon atoms, said alkyl orthosilicates having been 40 to 100 percent prehydrolyzed, i.e. reacted with from 0.15 to 0.50 mole of water per mole of alkoxy groups. When alkyl group, $R_1$, contains three or more carbons it may be straight or branched chain. I prefer to use the most common alkyl orthosilicate, ethyl silicate, but other silicates such as methyl silicate, propyl silicates, butyl silicates, pentyl silicates, hexyl silicates, heptyl silicates and octyl silicates can be readily used if 40 to 100 percent prehydrolyzed.

Ethyl cellulose and vinyl resin are added to the partially hydrolyzed alkyl silicate and thereafter one or more of the above-mentioned additives including alkyl orthoborates, ambifunctional silanes and Lewis Acid metal salts. In general, the use of an alkyl orthoborate and an ambifunctional silane in combination has provided the best overall final product taking into account all of the characteristics usually desired for protective coatings. The use of an alkyl orthoborate or an ambifunctional silane by themselves probably provides the next best overall product, and the use of a Lewis Acid metal salt provides a desirable product for some purposes but has certain characteristics which may be less desirable than the above products. A Lewis Acid metal salt may also be combined with an ambifunctional silane and/or an alkyl orthoborate to produce a desired product and in some cases it may also be desired to add some titanate with the above as aforesaid. The subject paints or coatings can be applied to metal, masonry, and other types of surfaces and in general the final resin product will contain somewhere around twenty percent (20%) silicon dioxide (silica).

The present invention therefore teaches a new and useful group of silicate polymer vehicles and process for their manufacture which are particularly well suited for use in paints and other coating substances including those which are applied to metal and masonry. Such paints and coating substances also provide protection from heat and fire, and are relatively resistant to abrasion and scratching. Furthermore, by properly selecting one or more of the above mentioned additives and combining them with a partially hydrolyzed vinyl ethyl silicate polymer such as an alkyl silicate-ethyl cellulose-vinyl resin terpolymer certain other desirable properties are also obtained including such things as shorter drying times and better adhesion characteristics, better pigment suspension characteristics, and improved hardness, toughness and stability characteristics.

It is therefore a principal object of the present invention to provide an improved vehicle for use in paints and other protective coating materials.

Another object is to provide an improved coating substance or paint.

Another object is to provide a vehicle for use in protective coatings which improves the adhesion characteristics thereof and enables them to be applied successfully even to metal surfaces that require little or no preconditioning.

Another object is to provide more stable silicate polymer vehicles for use in protective coatings and the like.

Another object is to provide a paint vehicle which can be used in a finish as well as in a primer coating.

Another object is to provide a vehicle for protective coatings which can be manufactured quickly and economically and with a minimum of equipment.

Another object is to provide an improved vehicle for use in paints and like substances that will enable the substance to be applied by being sprayed, brushed or by dipping, which paint will form an inorganic protective coating for metal, masonry, and other materials.

Another object is to provide a vehicle in which a relatively large amount of a protective material and/or pigment such as zinc dust can be suspended.

Another object is to increase the shelf-life of silicate based paint vehicles.

Another object is to provide silicate polymer vehicles which improve the hardness and toughness characteristics of coating substances such as paints.

Another object is to provide a protective coating material that can be applied to untreated metal and like surfaces as well as to pickled and sandblasted metal surfaces.

Another object is to provide a vehicle for protective coatings that will accept various pigments such as iron oxide, titanium oxide, chromium oxide, carbon black and like substances without reacting therewith.

These and other objects and advantages of the present invention will become apparent after considering the following specification which describes several examples of vehicles formulated in accordance with the present invention, which vehicles are included by way of illustration and not by way of limitation.

EXAMPLE I

A resin solution is prepared by mixing under agitation:

Ingredients:                                      Parts by weight
  Cellosolve (ethylene glycol monoethyl ether) __  13.45
  Ethanol 95 (95% ethyl alcohol and 5%
    water) _____  6.73
  Ethyl cellulose _____  0.82

The Cellosolve ingredient is a relatively slow solvent and is included to overcome the dry spray tendencies which are characteristic of faster solvents and the amount of Cellosolve that is used can be increased or decreased to vary the spraying and evaporating properties of the final product.

The ethyl cellulose is included in the mixture to give the final product the property of being able to hold a pigment in suspension which is highly desirable although difficult to obtain property of most known protective coating substances. The amount of ethyl cellulose can also be varied to change the suspension and viscosity characteristics as desired. A typical range for the ethyl cellulose in the final product is from about 0.25% to about 15%.

The ethanol 95 ingredient is a non-reactive mutual solvent with the Cellosolve for the ethyl cellulose and can be increased or decreased as long as the 5% water content is taken into account in the hydrolysis reaction which follows. The preparation of the solution, although usually done first as in this example, may be done after a later reaction which will be described, but if this is done a somewhat cloudy ester may result. Also, if ethanol 88 (88% ethyl alcohol and 12% water), which is the commercial grade of ethanol were used for the ethanol 95, adjustment would be required for the water content that is free to react. Thus, if ethanol 88 were used, the amount of water would be lowered and if acid in butanol were used, it would be raised to bring the total water to a desired level.

At room temperature or above and under agitation a hydrolysis reaction is performed by adding to the above resin solution the following materials in the amounts indicated:

Ingredients:                                      Parts by weight
  Butanol _____  11.25
  Ethanol 95 _____  11.25
  Ethyl silicate 40 (polysilicates averaging five
    silicon atoms per molecule with 40% $SiO_2$
    minimum and 40% hydrolyzed) _____  47.00
  1% hydrochloric acid in water _____   3.50

The butanol is included because it is a slower solvent than ethanol and provides for an evaporative balance between the ethanol and the Cellosolve. Furthermore, since the butanol contains no free water it does not affect the hydrolysis reaction. In slower evaporative versions of the present vehicle the butanol may be partially or completely replaced by Cellosolve. The 5% water in the ethanol 95 is calculated into the hydrolysis reaction but the ethanol 95 can be replaced by any water free non-reactive solvent mutual to Cellosolve and ethyl cellulose if sufficient water is then added to the mixture to make up the difference in the total water available for hydrolysis. Any alkyl silicate can be used including those which have been 40 to 100 percent prehydrolyzed. Ethyl silicate 40 is preferred for this example because it has a relatively higher silicate content and a lower cost compared to other commercially available ethyl silicates. The amount of ethyl silicate used in this example can be increased or decreased with the result that a resin having a higher or lower silicate content respectively will be produced. A typical range for the ethyl silicate ingredient is from about 10% to about 40% of the resulting vehicle. Acidified water such as the 1% HCl is used to further hydrolyze the ethyl silicate and to produce a nearly completely hydrolyzed resin suitable for curing on contact with moisture such as is found naturally in air. The term weak acid is also intended to include dilute solutions of protonic acids other than hydrochloric acid such as nitric acid, sulfuric acid and phosphoric acid. The amount of acidified water used will vary with the amount and type of ethyl silicate used. For example, two moles of water completely hydrolyzes ethyl silicate and any lesser amount will partially hydrolyze the same silicate. The acid is included as a catalytic agent to speed hydrolysis and in addition is added to assure the stability of the resin formed. This is important since there is a tendency for precipitates to form when the hydrolysis is carried out in an alkaline environment. The amount of acid may be varied and in actual test mixtures has been reacted with resultant acid concentrations in the range from about 0.005 to 3.0%. It has also been observed that the shelf-life of resins having resultant acid concentrations of over about 0.1% is less than those with acid concentrations that are below this amount.

While the hydrolysis reaction between the water and the silicate is taking place agitation is usually not required. When the reaction is started at or near room temperature (approximately 70° F.) the hydrolysis usually takes three hours or longer to reach the point where there is no free water left. The reaction may be started at higher temperatures, e.g. 90° F. to 110° F., if it is desirable to initiate the hydrolysis more quickly. An exothermal temperature rise of about 30° to 40° F. and a 1% loss in volume can be expected during this reaction. Although room temperature is preferred for this reaction it is possible to carry it out at other temperatures ranging as high as 300° F. to reduce the time required to produce a satisfactory resin.

Once the hydrolysis reaction is complete, one part by weight of 10% vinyl resin in butanol is added to the above composition under agitation and allowed to react at room temperature for a period of at least about five minutes to create a vinyl ethyl silicate resin such as an alkyl silicate-vinyl resin copolymer. The vinyl resin which is predissolved in the water free butanol is usually a polyvinyl acetal, preferably a polyvinyl butyral. More or less vinyl resin can be added but using more vinyl resin sometimes adversely affects both the stability and the cure properties and a range from about 0.25 to about 5.0% vinyl resin in the final product is usually preferred to provide the most desirable silicate polymer vehicle.

The vinyl resin may have medium to high molecular weight (such as about 10,000 to about 100,000) and an intrinsic viscosity in the range from about 0.81 to about 1.16. One suitable vinyl resin comprises between about 0.05 to about 0.5% polyvinyl acetate, between 19.5 and 20.0% polyvinyl alcohol and the balance being polyvinyl butyral in the range from 79.5 to 80.45%. It is also contemplated to use polyvinyl formal resin of a similar nature since it is possible to substitute the formal type for the butyral type in some variations. The vinyl resins in the subject vehicles are used for increasing the adhesion and flexibility properties and to improve hot water resistance in the immersion service of the vehicles. The resin ester interchange takes place with ethyl cellulose and alkyl silicate during the reaction period as they react to acidified conditions.

In order for the finished product to have the desired hardness characteristics and a rapid cure time an additive such as 5.00 parts by weight of 10% alkyl orthoborate dissolved in butanol is added to the composition under agitation and allowed to react therewith. Various borates have been utilized for this purpose including the alkyl orthoborates and boric acid. In general I have found that alkyl orthoborates of the formula $B(OR_2)_3$ wherein each of the alkyl groups $R_2$ contains from 1 to 8 carbon atoms are preferred. When $R_2$ has three or more carbon atoms, $R_2$ may be either straight or branched chain. Examples of suitable alkyl orthoborates include but are not limited to the following: triethyl borate, tri-n-propyl borate, triisopropyl borate, tributyl borate, triisobutyl borate, and tri-sec-butyl borate. Mixtures of alkyl orthoborates which form azeotrope borates are also useful. By azeotrope borates I mean a mixture of particular alkyl orthoborates wherein the borates are in a particular relative proportion such that an alcohol solution thereof when boiled does not change composition on boiling. It can also be done using boric acid in a direction controlled reaction step. The alkyl orthoborates used in the subject vehicles impart hardness to the coatings and reduce the required cure time. The azeotrope type has been found preferable and has been used to make a final product having from about 0.5 to about 6.0% alkyl orthoborate. Even higher alkyl orthoborate percentages can be obtained for some applications. For some specific uses, for example, a range from about 10% to about 15% is desirable. The reaction of the alkyl orthoborate may be conducted at room temperature or higher and two to three days are usually required for a room temperature reaction to be completed. The ethyl cellulose previously added enters into the reaction by an ester interchange with the silicate terpolymer as it does in all the following examples also. For example, an alkyl silicate-vinyl resin copolymer combines to form an alkyl silicate-vinyl resin-ethyl cellulose terpolymer. The result is a resin containing about 20% $SiO_2$ in this example. There is no particular disadvantage in allowing this reaction to take place at room temperature since the desired pigment or protective material such as zinc dust or iron oxide is usually added to the vehicle at the site of use before the protective coating is applied. Therefore the mixture containing alkyl orthoborate can finish its reaction in the vehicle container during shipment or storage. The subject vehicle as formulated will contain from about 60% to about 90% by weight of the resin bearing solvent, from about 10% to about 40% by weight of the hydrolyzed alkyl silicate and the additive which may be an alkyl orthoborate, a Lewis Acid metal salt or an ambifunctional silane and optionally a titante or a combination thereof will be present in an amount by weight or from about 0.5% to about 15.0%.

The vehicle described in this example can be mixed with relatively large quantities of zinc dust to form a paint which when applied to a surface results in a coating after drying which is from about 75% to about 97% zinc. A high percentage of zinc in the final coating is very important to the protection that is obtained. Amounts of zinc less than about 88% sharply reduces the desired galvanic action of the zinc coating because each particle of zinc then tends to be isolated within its own capsule of the vehicle. Since silicate vehicles are generally also dielectrics, the zinc particles in such paints are insulated from each other and from the surface to be protected, and the galvanic action is thereby impaired.

Pigments which could be used include aluminum powder, stainless steel flake, zinc dust, cuprous oxide, iron oxide, chromic oxide, zinc oxide, antimony oxide, carborundum, graphite, chromates, magnesium oxide, magnesium silicate, silicas, aluminum silicates, phthalocyanine blues and greens, quinacciridone reds and similar materials such as the pigments listed in the National Paint, Varnish and Lacquer Pigment Book. It is difficult to establish precise ranges for all of the many pigments that could be used since each color and gloss requires a separate formulation or variation in pigment volume concentration. However, a general statement can be made that normally for about 100 parts of resin solids, the total pigment range would be from about 7 to about 2000 parts. The extremes can be explained as being due to end usage varying from a relatively transparent to a fully hiding and decorative protective coating. Also, the ease of wetting the pigments by the resin as well as personal preferences are involved. A typical zinc dust pigmented coating can be prepared at about 20 lbs. of zinc dust to about 5.25 lbs. of resin and will result in about 96% to about 97% zinc content when cured. Another commercially acceptable proportion is about 15 lbs. of zinc dust to 6.5 lbs. of resin. These proportions are given only for illustrative purposes since, as explained, an extremely wide variation of pigment proportion is possible. The resin used in these proportions is the resin solution and not the solids. Normally, the pigmentation is governed by the amount being sufficient to prevent the cured coating from crazing or shrinking and from not being overly loaded to cause excessive chalking or dusting.

Paints formulated with the borate containing vehicle as set forth in this example may be used with appropriate pigments and can be used as a top coat, finish coat, or as a primer. This is true because coatings so formed have better hardness and toughness characteristics than other types of silicate polymer paints such as those that contain a titanate only instead of a borate although some small amount of titanate may be added to various of the formulations involved without any noticeable reduction in hardness. Paints made in accordance with this example are so adhesive that they can be applied to metal which has been treated only by pickling and not by the usually required sandblasting. Borate paints are also generally more stable than those containing titanates as evidenced by their having substantially longer shelf-lives.

EXAMPLE II

| Ingredients: | Parts by weight |
| --- | --- |
| Cellosolve | 13.45 |
| Ethanol 95 | 17.98 |
| Ethyl cellulose | 0.82 |
| Butanol | 11.25 |
| Ethyl silicate 40 | 47.00 |
| 1% HCl | 3.50 |
| 10% vinyl resin in butanol | 1.00 |
| 20% alkyl orthoborate in butanol | 1.00 |

These materials are combined and reacted as in Example I and thereafter at least five minutes after the borate is added, 4.00 parts by weight of 10% ambifunctional silane in butanol is added. By ambifunctional silane, I mean a silane which has both a silane reactive group and an organo reactive group. Exemplary ambifunctional silanes are described by the formula:

$$X_1(CH_2)_nSi(OR_3)_{3-p}(R_4)_p$$

wherein $R_3$ is alkyl, aryl or acyl. When $R_3$ is alkyl suitable alkyl groups include those having from 1 to 6 carbon atoms and when the alkyl group has three or more carbon atoms the carbons may be linked as either straight or branched chain. For example, when $R_3$ is alkyl, $R_3$ may be methyl, ethyl, n-propyl, isopropyl, n-butyl, isobutyl, sec-butyl, and so forth. When $R_3$ is aryl, suitable aryl groups include phenyl and naphthyl. When $R_3O$ is acyl, suitable acyl groups include those of the formula:

$$R_5 \overset{O}{\underset{\|}{C}} O$$

wherein $R_5$ may be alkyl or aryl as defined for $R_3$. $R_4$ may be alkyl as defined for $R_3$. The number $p$ may be either one or zero. $X_1$ is selected from the group consisting of (1) amino, (2) β-aminoethylamino, (3) halo such as chloro, bromo and iodo, (4) methacryloxy, (5) glycidoxy, (6) vinyl, (7) 3,4-epoxycyclohexyl, and (8) N-bis(β-hydroxyethyl)amino. When $X_1$ is vinyl, $n$ is zero, otherwise $n$ is an integer between two and four inclusive. Other suitable ambifunctional silanes are of the formula:

$$X_1(CH_2)_nSi(X_2)_{3-p}(R_4)_p$$

wherein $X_1$ is vinyl, $X_2$ is halo such as chloro, bromo or iodo, $R_4$ is alkyl as defined above, and $p$ is an integer as defined above.

Suitable ambifunctional silanes of the above formula include the following:

n-(trimethoxysilylpropyl)ethylenediamine,
n-(dimethoxymethylsilylisobutyl)ethylenediamine,
γ-methacryloxypropyltrimethoxysilane,
γ-glycidoxypropyltrimethoxysilane,
vinyltrichlorosilane,
methylvinyldichlorosilane,
vinyltriacetoxysilane,
γ-chloropropyltrimethoxysilane,
vinyltrimethoxysilane,
vinyltriethoxysilane,
vinyl-tris(β-methoxyethoxy)silane,
N-bis(β-hydoxyethyl)-γ-aminopropyltriethoxysilane,
γ-aminopropyltriethoxysilane,
β-(3,4-epoxycyclohexyl)ethyltrimethoxysilane,
γ-(triethoxysilylpropyl)ethylenediamine,
γ-(diethoxymethylsilylisobutyl)ethylenediamine,
γ-methacryloxypropyltriethoxysilane,
γ-glycidoxypropyltriethoxysilane,
γ-aminopropyltriphenoxysilane, and
γ-aminopropyltribenzoylsilane.

It is preferable to keep the silanes in the range from about 0.2 to about 2.0%, more preferably in the range from about 0.2 to about 0.5%, in the final vehicle mixture although it is possible to use greater and lesser amounts with varying degrees of success. The ambifunctional silanes are used as coupling agents for adhesion under various conditions. The silanes form molecular bridges between the organo resins and hydroxyl containing substrates. These organo-functional groups operating on silicon have the same reactivity they would have as organic molecules and they are used principally to improve the adhesion and the water resistance on immersion of the coatings in which they exist.

When the substances of Example II are used they usually result in a resin containing about 20% $SiO_2$ and it has been found that such a vehicle has even greater adhesive properties and a faster drying time that formulations that use only an alkyl orthoborate. It has also been found that when alkyl orthoborate is left out altogether a vehicle results which may be applied with even better success from some standpoints to metal that has not been prepared in advance as by being sandblasted, and the vehicle without any alkyl orthoborate has been found to have at least about 20% longer shelf-life than other forms of the vehicles and even longer shelf-life when compared to titanate vehicles.

EXAMPLE III

Ingredients:                           Parts by weight
    Cellosolve _____ 13.45
    Ethanol 95 _____ 17.98
    Ethyl cellulose _____ 0.82
    Butanol _____ 11.25
    Ethyl silicate 40 _____ 47.00
    1% HCl in water _____ 3.50
    10% vinyl resin in butanol _____ 1.00

These materials are combined and reacted as in Example I and after at least about five minutes and under agitation at room temperature or above, 3.00 parts by weight of butanol and 1.00 part by weight of 10% ambifunctional silane in butanol are added. A description of the types of silanes that can be used as set forth in Example II. At least five minutes later 1.00 part by weight of 20% alkyl orthoborate in butanol is added. The reaction of the alkyl orthoborate usually takes place much slower and may take as long as three days or more to complete, but since this part of the reaction can be carried out in the shipping container in which the product is sold no manufacturing problem is presented. This example shows an alternate method of creating a vehicle that is the same or similar to the vehicle of Example II.

EXAMPLE IV

Ingredients:                           Parts by weight
    Cellosolve _____ 13.45
    Ethanol 95 _____ 17.98
    Ethyl cellulose _____ 0.82
    Butanol _____ 11.25
    Ethyl silicate 40 _____ 47.00
    1% HCl in water _____ 3.50
    10% vinyl resin in butanol _____ 1.00

These materials are combined and reacted as in Example I and after at least about five minutes and under agitation conditions at room temperature or above, 4.80 parts by weight of butanol and 0.20 part by weight of a Lewis Acid metal salt are added. Suitable Lewis Acid metal salts are of the formula $MZ_m$ where M is a metal and Z is preferably a halo such as chloro, bromo, or iodo and $m$ is an integer from 1 to 5 depending on the valence of M. Suitable Lewis Acid metal salts include but are not limited to the following: $BF_3$, $SnCl_4$, $ZnCl_2$, $FeCl_2$, $FeCl_3$, $FeBr_2$, $FeBr_3$, $BeCl_2$, $BCl_3$, $SbCl_5$, $TiCl_4$, $CoCl_2$, $NiCl_2$, $SnBr_4$, $BBr_3$, and $PF_5$. The Lewis Acid metal salts are potential reactants and their cost normally governs their use in a particular vehicle. The Lewis Acid metal salts are alternates to the alkyl orthoborates and are used when it is desired to improve the coating hardness characteristics and to further accelerate the cure cycle.

Example IV results in a resin containing about 20% $SiO_2$. This formulation has the advantage over some of the others of having increased film hardness and increased speed of cure. The controlling factor in deciding which Lewis Acid metal salt to use is usually based on availability and cost rather than on chemical considerations.

EXAMPLE V

| Ingredients: | Parts by weight |
|---|---|
| Cellosolve | 13.45 |
| Ethanol 95 | 17.98 |
| Ethyl cellulose | 0.82 |
| Butanol | 11.25 |
| Ethyl silicate 40 | 47.00 |
| 1% HCl in water | 3.50 |
| 10% vinyl resin in butanol | 1.00 |

These materials are combined and reacted as in Example I and after at least five minutes and under agitation at room temperature or above, about 0.20 part by weight of boron trifluoride and about 0.80 part by weight of butanol are added. After at least about five more minutes, 4.00 parts by weight of 10% silane in butanol are added. The resultant product is one that has relatively good film hardness and adhesion characteristics and a relatively short curing time.

EXAMPLE VI

Charge into reaction vessel with agitation and at room temperature the following ingredients in the order set forth:

| Ingredients: | Parts by weight |
|---|---|
| Butanol | 11.25 |
| Ethanol 95 | 11.25 |
| Ethyl silicate 40 | 47.00 |
| 1% HCl in water | 3.50 |

After at least five minutes of agitation the above mixture should be allowed to react exothermally for at least about three hours to produce the desired hydrolysis. Thereafter, under agitation conditions, 5.00 parts by weight of 10% polyvinyl acetal resin in butanol are added and allowed to react until the resultant composition forms a clear composition. 1.00 part by weight of 10% alkyl orthoborate in butanol is then added and again allowed to react until the result again reaches a clear condition. The types of alkyl orthoborates that can be used are the same as described above. Next 21.00 parts by weight of 4% ethyl cellulose in water free solvent are added under agitation, which ingredient reacts in an ester interchange with the vinyl borate silicate terpolymer to form an alkyl silicate-ethyl cellulose-vinyl resin terpolymer additionally containing alkyl orthoborate. The resulting vehicle has properties similar to those obtained in Example I.

EXAMPLE VII

Charge into a reaction vessel with agitation at room temperature the following:

| Ingredients: | Parts by weight |
|---|---|
| Cellosolve | 12.45 |
| Ethanol 95 | 6.40 |
| Ethyl cellulose | 0.40 |

Then continuing to agitate add:

| | Parts by weight |
|---|---|
| Ethyl silicate 40 | 70.05 |
| ½% HCl in water | 0.70 |

The agitation is then stopped and the resultant mixture is allowed to exothermally react. Thereafter, under resumed agitation, 2.50 parts by weight of 10% polyvinyl acetal resin in butanol are added and at least five minutes later 7.50 parts by weight of 10% alkyl orthoborate in butanol are also added. This example results in a vehicle having at least 30% silica in the final product.

EXAMPLE VIII

Charge into a reaction vessel with agitation at room temperature the following:

| Ingredients: | Parts by weight |
|---|---|
| Cellosolve | 13.45 |
| Ethanol 95 | 17.98 |
| Ethyl cellulose | 0.82 |
| Butanol | 11.25 |
| Ethyl silicate 40 | 47.00 |
| ½% HCl in water | 3.50 |
| 10% vinyl resin in butanol | 1.00 |

These materials are combined and reacted as in Example I and after at least five minutes and under agitation at room temperature or above, 4.00 parts by weight of 10% alkyl titanate in butanol are added. After at least five more minutes, 1.00 parts by weight of 20% silane in butanol is added. Various alkyl titanates of the formula:

$$Ti(Cl)_q(OR_6)_{4-q} \text{ or } Ti(OH)_q(OR_6)_{4-q}$$

can be optionally used in my vehicle formulation. In the above formula $q$ is an integer 0 to 4 and $R_6$ is an alkyl group having 1 to 6 carbon atoms and when $R_6$ has three or more carbons $R_6$ can be straight or branched chain. Exemplary titanates include $TiCl_4$ which undergoes partial solvolysis in the presence of alcohols of the formula:

$$R_6OH$$

wherein $R_6$ is defined as above. Solvolysis is usually incomplete in the absence of a base such as the ethoxide ion, ammonia, pyridine, and so forth. For example $TiCl_4$ in the presence of $C_2H_5OH$ may react as follows:

$$TiCl_4 + 3C_2H_5OH = 2HCl + TiCl_2(OC_2H_5)_2 \cdot C_2H_5OH.$$

Suitable titanates of the formula:

$$Ti(OR_6)_4$$

are isopropyl titanate, tetra n-butyl titanate and tetra 2-ethyl hexyl titanate, as well as others capable of producing transesterification and esterification. Alkyl titanate is included in some formulations to assure a rapid cure in extreme low humidity environments. The alkyl titanates serve as moisture scavengers and substantially shorten the cure time. Other examples of the alkyl titanates are the tetra ethyl titanates and the chloro containing titanates. Normally, however, the simpler alkyl titanates are preferred. As is appreciated in the art, several hydrates of alkyl titanates of the formula:

$$Ti(OH)_q(OR_6)_{4-q}$$

are known. These materials are obtained readily by the hydrolysis of alkyl titanates in the presence of traces of water.

The resulting formulation is a resin containing about 20% $SiO_2$ which has better adhesive characteristics than those that include a titanate alone.

EXAMPLE IX

Charge into a reaction vessel with agitation at room temperature the following ingredients in the amounts indicated:

| Ingredients: | Parts by weight |
|---|---|
| Cellosolve | 13.45 |
| Ethanol 95 | 17.98 |
| Ethyl cellulose | 0.82 |
| Butanol | 11.25 |
| Ethyl silicate 40 | 47.00 |
| ½% HCl in water | 3.50 |
| 10% vinyl resin in butanol | 1.00 |

These ingredients are combined and reacted as in Example I and after at least five minutes and under agitation at room temperature or above, 1.00 part by weight of an ingredient such as 20% borate in butanol is added.

After at least five minutes more, 4.00 parts by weight of 10% titanate in butanol are added. This produces a resin containing about 20% $SiO_2$, which resin has better stability and adhesion characteristics than those resins that have a titanate additive alone.

This formulation results in a resin containing about 20% $SiO_2$. In examples VIII and IX, the order in which the additives are reacted with the vinyl ethyl silicate such as alkyl silicate-ethyl cellulose-vinyl resin terpolymer can be reversed if desired without producing any undesirable results.

Thus there has been disclosed several different forms of a vehicle for use in coating substances such as paints and the like which fulfill all of the objects and advantages sought therefore. It is apparent, however, that many changes, variations, modifications, and other combinations and amounts of the ingredients disclosed and of the manner of mixing and reacting them are possible without departing from the spirit and scope of the invention. The invention is intended to cover all such changes, variations, modifications and combinations which do not depart from the spirit and scope of the invention and is limited only by the claims which follow.

What is claimed is:

1. A reaction vehicle for use in protective coating substances including in combination a resin bearing solvent formed by a mixture of glycol ether, an alcohol and ethyl cellulose; a silicate formed by an alcohol, an alkyl silicate and a weak acid in the presence of a water solution hydrolyzed in a range from about 40% to about 100%; ester interchanges taking place during the reaction between the resin bearing solvent and the silicate; and a material chosen from any one or more of the members of a group consisting of alkyl orthoborates of the formula $B(OR_2)_3$ wherein $R_2$ is alkyl containing from 1 to 8 carbon atoms; ambifunctional silanes of the formula $X_1(CH_2)_nSi(OR_3)_{3-p}(R_4)_p$ wherein $R_3$ is alkyl containing from 1 to 6 carbon atoms, aryl or acyl of the formula $R_5CO$ wherein $R_5$ is alkyl or aryl as defined for $R_3$, $R_4$ is alkyl containing from 1 to 6 carbon atoms, $p$ is either 1 or 0, $X_1$ is amino, $\beta$-aminoethylamino, halo, methacryloxy, glycidoxy, vinyl, 3,4-epoxycyclohexyl or N-bis($\beta$-hydroxyethyl)amino, $n$ is 0 where $X_1$ is vinyl, otherwise $n$ is an integer between 2 and 4 inclusive, ambifunctional silanes of the formula $X_1(CH_2)_nSi(X_2)_{3-p}(R_4)_p$ wherein $X_1$ is vinyl, $X_2$ is halo and $R_4$, $n$ and $p$ are as defined above; and Lewis Acid metal salts, said resin bearing solvent being present in the vehicle in an amount by weight of from about 60% to about 90%, said hydrolyzed alkyl silicate being present in the vehicle in an amount by weight of from about 10% to about 40%, said material from the group consisting of any one or more of the alkyl orthoborates, ambifunctional silanes and Lewis Acid metal salts being present in an amount by weight of the vehicle solids of from about 0.5% to about 15.0%.

2. The reaction vehicle of claim 1 including the addition of an organo cellulose ingredient with an ethoxy substitution between 45.5 and 49.0% and a viscosity range when cut in toluene-ethanol (80:20) at a 5% concentration of 80 or more centapoise.

3. The reaction vehicle of claim 2 including a pigment, said pigment being present in the vehicle in a range from about 7 to about 2000 parts per hundred parts of vehicle.

4. The reaction vehicle of claim 3 wherein the pigment is chosen from the group consisting of zinc, iron oxide, titanium oxide, chromium oxide and carbon black.

5. A silicate polymer vehicle for use in protective coating substances and the like comprising in combination in a partially hydrolyzed vinyl alkyl silicate solution hydrolyzed in a range from about 40% to about 100%, said partially hydrolyzed vinyl alkyl silicate solution being obtained by reacting a mixture that includes an ethyl cellulose ingredient, an alkyl silicate ingredient, and a weak acid, which ingredients in reacting undergo hydrolysis and an ester interchange, and a hardening agent chosen from any one or more of the members of a group consisting of alkyl orthoborates of the formula $B(OR_2)_3$ wherein $R_2$ is alkyl containing from 1 to 8 carbon atoms; ambifunctional silanes of the formula

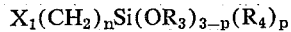

wherein $R_3$ is alkyl containing from 1 to 6 carbon atoms, aryl or acyl of the formula $R_5CO$ wherein $R_5$ is alkyl or aryl as defined for $R_3$, $R_4$ is alkyl containing from 1 to 6 carbon atoms, $p$ is either 1 or 0, $X_1$ is amino, $\beta$-aminoethylamino, halo, methacryloxy, glycidoxy, vinyl, 3,4-epoxycyclohexyl or N-bis($\beta$-hydroxyethyl)amino, $n$ is 0 where $X_1$ is vinyl, otherwise $n$ is an integer between 2 and 4 inclusive, ambifunctional silanes of the formula $X_1(CH_2)_nSi(X_2)_{3-p}(R_4)_p$ wherein $X_1$ is vinyl, $X_2$ is halo and $R_4$, $n$ and $p$ are as defined above; and Lewis Acid metal salts, said hardening agent being present in the vehicle in an amount by weight of the vehicle solids in a range from about 0.1% to about 15.0%.

6. The vehicle set forth in claim 5 including an alkyl titanate additive in an amount representing from about 0.1% to about 15.0% by weight of the vehicle solids, said alkyl titanate being selected from the group consisting of tetra isopropyl titanate, tetra n-butyl titanate and tetra 2-ethyl hexyl titanate.

7. The vehicle set forth in claim 5 including the addition of ethyl cellulose in an amount representing from about 0.25% to about 15.0% by weight of the vehicle solids.

8. A vehicle for paint comprising a partially hydrolyzed vinyl alkyl silicate hydrolyzed in a range from about 40% to about 100%, said silicate representing from about 10% to about 40% by weight of the vehicle, said partially hydrolyzed vinyl alkyl silicate solution being obtained by reacting a mixture that includes an ethyl cellulose ingredient, an alkyl silicate ingredient and a weak acid, which ingredients in reacting undergo hydrolysis and an ester interchange in combination with a mixture of any two hardening agents chosen from the group consisting of alkyl orthoborates of the formula $B(OR_2)_3$ wherein $R_2$ is alkyl containing from 1 to 8 carbon atoms; ambifunctional silanes of the formula

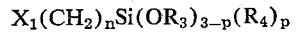

wherein $R_3$ is alkyl containing from 1 to 6 carbon atoms, aryl or acyl of the formula $R_5CO$ wherein $R_5$ is alkyl or aryl as defined for $R_3$, $R_4$ is alkyl containing from 1 to 6 carbon atoms, $p$ is either 1 or 0, $X_1$ is amino, $\beta$-aminoethylamino, halo, methacryloxy, glycidoxy, vinyl, 3,4-epoxycyclohexyl or N-bis ($\beta$-hydroxyethyl)amino, $n$ is 0 where $X_1$ is vinyl, otherwise $n$ is an integer between 2 and 4 inclusive, ambifunctional silanes of the formula $X_1(CH_2)_nSi(X_2)_{3-p}(R_4)_p$ wherein $X_1$ is vinyl, $X_2$ is halo and $R_4$, $n$ and $p$ are as defined above; and Lewis Acid metal salts, said two hardening agents together being present in the vehicle in a range from about 0.1% to about 15.0% by weight of the silicate.

9. The vehicle set forth in claim 8 including the addition of an alkyl titanate additive in an amount representing from about 0.1% to about 15.0% by weight of the silicate, said alkyl titanate additive being selected from the group consisting of tetra isopropyl titanate, tetra n-butyl titanate, and tetra 2-ethyl hexyl titanate.

10. A vehicle for paint comprising a vinyl alkyl silicate hydrolyzed in a range from about 40% to about 100% and representing from about 10.0% to about 40.0% by weight of the vehicle, said partially hydrolyzed vinyl alkyl silicate solution being obtained by reacting a mixture that includes an ethyl cellulose ingredient, an alkyl silicate ingredient, and a weak acid, which ingredients in reacting undergo hydrolysis and an ester interchange, and one or more additives selected from the group consisting of alkyl orthoborates of the formula $B(OR_2)_3$ wherein $R_2$ is alkyl containing from 1 to 8 carbon atoms; ambifunctional silanes of the formula $X_1(CH_2)_nSi(OR_3)_{3-p}(R_4)_p$ wherein $R_3$ is alkyl containing from 1 to 6 carbon atoms, aryl or acyl of the formula $R_5CO$ wherein $R_5$ is alkyl or aryl as defined for $R_3$, $R_4$ is alkyl containing from 1 to 6 carbon atoms, $p$ is either 1 or 0, $X_1$ is amino, β-aminoethylamino, halo, methacryloxy, glycidoxy, vinyl, 3,4,-epoxycyclohexyl or N-bis(β-hydroxyethyl)amino, $n$ is 0 where $X_1$ is vinyl, otherwise $n$ is an integer between 2 and 4 inclusive, ambifunctional silanes of the formula $X_1(CH_2)_nSi(X_2)_{3-p}(R_4)_p$ wherein $X_1$ is vinyl, $X_2$ is halo and $R_4$, $n$ and $p$ are as defined above; and Lewis Acid metal salts, said additive being present in combination in the vehicle in a range from about 0.2% to about 15.0% by weight of the vehicle solids.

11. The vehicle set forth in claim 10 including the addition of an alkyl titanate ingredient present in a range from about 0.1% to about 15.0% by weight of the vehicle solids, said alkyl titanate ingredient being selected from the group consisting of tetra isopropyl titanate, tetra n-butyl titanate, and tetra 2-ethyl hexyl titanate.

12. A process for the manufacture of a vehicle for use in paints including mixing together and reacting a vinyl ethyl silicate hydrolyzed in a range from about 40% to about 100%, said partially hydrolyzed silicate being present in the vehicle in a range from about 10% to about 40% by weight of the vehicle, said partially hydrolyzed vinyl ethyl silicate solution being obtained by reacting a mixture that includes an ethyl cellulose ingredient, an ethyl silicate ingredient, and a weak acid, which ingredients in reacting undergo hydrolysis and an ester interchange, and a substance chosen from the group consisting of alkyl orthoborates of the formula $B(OR_2)_3$ wherein $R_2$ is alkyl containing from 1 to 8 carbon atoms; ambifunctional silanes of the formula $$X_1)CH_2)_nSi(OR_3)_{3-p}(R_4)_p$$

wherein $R_3$ is alkyl containing from 1 to 6 carbon atoms, aryl or acyl of the formula $R_5CO$ wherein $R_5$ is alkyl or aryl as defined for $R_3$, $R_4$ is alkyl containing from 1 to 6 carbon atoms, $p$ is either 1 or 0, $X_1$ is amino, β-aminoethylamino, halo methacryloxy, glycidoxy, vinyl, 3,4-epoxycychlohexyl or N-bis(β-hydroxyethyl)amino, $n$ is 0 where $X_1$ is vinyl, otherwise $n$ is an integer between 2 and 4 inclusive, ambifunctional silanes of the formula $X_1(CH_2)_nSi(X_2)_{3-p}(R_4)_p$ wherein $X_1$ is vinyl, $X_2$ is halo and $R_4$, $n$ and $p$ are as defined above; and Lewis Acid metal salts, said substance being in the vehicle in an amount representing from about 0.1% to about 15.0% by weight of the solids in the vehicle.

13. The process of claim 12 including the further step of reacting an alkyl titanate into the mixture in an amount representing from about 0.1% to about 15.0% by weight of the solids present in the vehicle, said alkyl titanate being selected from the group consisting of tetra isopropyl titanate, tetra n-butyl titanate, and tetra 2-ethyl hexyl titanate.

14. A process for the manufacture of a vehicle for use in protective coatings and the like including the step of
mixing together in the presence of a mutually compatible solvent selected of a group of water and non-water bearing solvents and reacting at a temperature between about 25° C. and about 150° C. to produce an ester interchange, a partially hydrolyzed vinyl ethyl silicate and cellulose, said silicate being hydrolyzed in a range from about 40% to about 100% and representing from about 10% to about 40% by weight of the vehicle, said reaction taking place within from about five minutes to several days or longer depending on the temperature of the reaction, mixing together and reacting the resultant composition at a temperature between about 25° C. and about 150° C. with a substance chosen from the group consisting of one or more of the following substances from the group consisting of alkyl orthoborates of the formula $B(OR_2)_3$ wherein $R_2$ is alkyl containing from 1 to 8 carbon atoms; ambifunctional silanes of 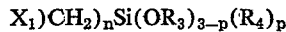 the formula $X_1(CH_2)_mSi(OR_3)_{3-p}(R_4)_p$ wherein $R_3$ is alkyl containing from 1 to 6 carbon atoms, aryl or acyl of the formula $R_5CO$ wherein $R_5$ is alkyl or aryl as defined for $R_3$, $R_4$ is alkyl containing from 1 to 6 carbon atoms, $p$ is either 1 or 0, $X_1$ is amino, β-aminoethylamino, halo, methacryloxy, glycidoxy, vinyl, 3,4-epoxycyclohexyl or N-bis(β-hydroxyethyl)-amino, $n$ is 0 where $X_1$ is vinyl, otherwise $n$ is an integer between 2 and 4 inclusive, ambifunctional silanes of the formula $X_1(CH_2)_mSi(X_2)_{3-p}(R_4)_p$ wherein $X_1$ is vinyl, $X_2$ is halo and $R_4$, $n$ and $p$ are as defined above; and Lewis Acid metal salts in an amount from about 0.1% to about 15.0% by weight of the resulting solids.

15. The process of claim 14 including the further step of adding from about 0.1% to about 15.0% by weight of the vehicle solid an alkyl titanate selected from a group consisting of tetra isopropyl titanate, tetra n-butyl titanate, and tetra 2-ethyl hexyl titanate.

16. The process of claim 14 including the further step of adding an amount of pigment to the vehicle in a range from about 7 parts to about 2000 parts of pigment per 100 parts of the vehicle.

17. A silicate polymer vehicle for use in protective coating substances and the like comprising in combination in a partially hydrolyzed vinyl alkyl silicate solution hydrolyzed in a range from about 40% to about 100%, said partially hydrolyzed vinyl alkyl silicate solution being obtained by reacting a mixture that includes an ethyl cellulose ingredient, an alkyl silicate ingredient, a vinyl resin and a weak acid, which ingredients in reacting undergo hydrolysis and an ester interchange, and a hardening agent chosen from any one or more of the members of a group consisting of the alkyl orthoborates: triethyl borate, tri-n-propyl borate, triisoporpyl borate, tributyl borate, triisobutyl borate, and tri-sec-butyl borate; the ambifunctional silanes: vinyltrimethoxysilane, vinyltriethoxysilane, vinyl-tris(β - methoxyethoxy)silane, N - bis(β - hydroxyethyl)-γ-aminopropyltriethoxysilane, γ - aminopropyltriethoxysilane, β - (3,4 - epoxycyclohexyl)ethyltrimethoxysilane, γ-triethoxysilylpropyl)ethylenediamine, γ-(diethoxymethylsilylisobutyl) ethylenediamine, γ-methacryloxypropyltriethoxysilane, γ-glycidoxypropyltriethoxysilane, γ-aminopropyltriphenoxysilane and γ-aminopropyltribenzoylsilane; and the Lewis Acid metal salts: $BF_3$, $SnCl_4$, $ZnCl_2$, $FeCl_2$, $FeCl_3$, $FeBr_2$, $FeBr_3$, $BeCl_2$, $BCl_3$, $SbCl_5$, $TiCl_4$, $CoCl_2$, $NiCl_2$, $SnBr_4$, $BBr_3$, and $PF_5$, said hardening agent being present in the vehicle in an amount by weight of the vehicle solids in a range from about 0.1% to about 15.0%.

18. The vehicle set forth in claim 17 including the addition of an alkyl titanate ingredient present in a range from about 0.1% to about 15.0% by weight of the vehicle solids, said alkyl titanate ingredient being selected from the group consisting of tetra isopropyl titanate, tetra-n-butyl titanate, and tetra 2-ethyl hexyl titanate.

19. A silicate polymer vehicle for use in protective coating substances and the like comprising in combination in a partially hydrolyzed vinyl alkyl silicate solution hydrolyzed in a range from about 40% to about 100%, said partially hydrolyzed vinyl alkyl silicate solution being obtained by reacting a mixture that includes an ethyl cellulose ingredient, an alkyl silicate ingredient, a vinyl resin and a weak acid, which ingredients in reacting undergo hydrolysis and an ester interchange, and a hardening agent chosen from any one or more of the members of a group consisting of alkyl orthoborates of the formula $B(OR_2)_3$ wherein $R_2$ is alkyl containing from 1 to 8 carbon atoms; ambifunctional silanes of the formula $X_1(CH_2)_mSi(OR_3)_{3-p}(R_4)_p$ wherein $R_3$ is alkyl containing from 1 to 6 carbon atoms, aryl or acyl of the formula $R_5CO$ wherein $R_5$ is alkyl or aryl as defined for $R_3$, $R_4$ is alkyl containing from 1 to 6 carbon atoms, $p$ is either 1 or 0, $X_1$ is amino, β-aminoethylamino, halo, methacryloxy, glycidoxy, vinyl, ,4-epoxycyclohexyl or N-bis(β-hydroxyethyl)amino, $n$ is 0 where $X_1$ is vinyl, otherwise $n$ is an integer between 2 and 4 inclusive, ambifunctional silanes of the formula $X_1(CH_2)_n Si(X_2)_{3-p}(R_4)_p$ wherein $X_1$ is vinyl, $X_2$ is halo and $R_4$, $n$ and $p$ are as defined above; and Lewis Acid metal salts, said hardening agent being present in the vehicle in an amount by weight of the vehicle solids in a range from about 0.1% to about 15.0%.

References Cited

UNITED STATES PATENTS 3,730,746   5/1973   Boaz ............ 106—287 SE

THEODORE MORRIS, Primary Examiner

U.S. Cl. X.R.

106—14, 193 M, 194

UNITED STATES PATENT OFFICE
CERTIFICATE OF CORRECTION

Patent No. 3,832,204                     Dated August 27, 1974

Inventor(s) Donald P. Boaz

It is certified that error appears in the above-identified patent and that said Letters Patent are hereby corrected as shown below:

Column 6, line 3, "titante" should be titanate.

Column 6, line 4, "or" should be of.

Column 8, line 4, "that" should be than.

Column 8, line 28, "as" should be is.

Column 13, line 34, after "$X_1$" delete ")" and substitute therefor --- (---.

Column 13, line 39, after "halo" insert --- , ---.

Column 13, line 40, "epoxycychlohexyl" should be epoxycyclohexyl.

Column 13, line 56, "step" should be steps.

Column 14, line 35, "triisoporpyl" should be triisopropyl.

Column 14, line 41, after "$\gamma$-" (first occurrence) insert --- ( ---.

Column 15, line 1, after "vinyl," insert --- 3 ---.

Signed and sealed this 17th day of December 1974.

(SEAL)
Attest:

McCOY M. GIBSON JR.　　　　　　　　　C. MARSHALL DANN
Attesting Officer　　　　　　　　　　Commissioner of Patents